United States Patent [19]
Oliver et al.

[11] Patent Number: 5,706,559
[45] Date of Patent: Jan. 13, 1998

[54] LEAF SPRING TIP INSERT

[75] Inventors: James J. Oliver, Orion; Richard F. Pierman, Northville, both of Mich.; Michael J. Maure, Chatham, Canada

[73] Assignee: Eaton Corporation, Cleveland, Ohio

[21] Appl. No.: 732,733

[22] Filed: Oct. 18, 1996

[51] Int. Cl.$^6$ .................. A44B 17/00; F16B 19/00
[52] U.S. Cl. .................. 24/297; 24/115 M; 24/453; 411/508
[58] Field of Search .................. 24/297, 289, 453, 24/115 M, 136 R; 411/508, 509, 510

[56] References Cited

U.S. PATENT DOCUMENTS

| | | | |
|---|---|---|---|
| 829,837 | 8/1906 | Brisacher | 24/453 |
| 1,365,411 | 1/1921 | Kearney | 24/136 R |
| 2,133,871 | 10/1938 | Reed | 411/508 |
| 2,621,921 | 12/1952 | Churchill | 267/49 |
| 2,961,723 | 11/1960 | Hamman | 24/289 |
| 3,119,299 | 1/1964 | Sarafinas | 411/508 |
| 3,126,185 | 3/1964 | Christman | 248/74 |
| 3,213,500 | 10/1965 | Thompson | 24/73 |
| 3,220,078 | 11/1965 | Preziosi | |
| 3,233,502 | 2/1966 | Fernberg | 411/508 |
| 3,335,471 | 8/1967 | Seckerson | 24/221 |
| 3,893,208 | 7/1975 | Yuda | 411/508 |
| 3,982,844 | 9/1976 | De Anda et al. | 24/115 M |
| 4,059,938 | 11/1977 | Aimar | 411/508 |
| 5,219,151 | 6/1993 | Stewart et al. | 267/262 |

*Primary Examiner*—Victor N. Sakran
*Attorney, Agent, or Firm*—Albert E. Chrow

[57] ABSTRACT

A vehicular leaf spring plate tip liner insert is provided, having a variety of configurations (50, 100, 150, 200, 250), of which one preferred embodiment is referenced by numeral (50). Insert (50) has a pad portion (3) adapted to provide a pad between adjacent leaf spring tips and at least one shank portion (4) extending from pad portion (3). Shank portion (4) is axially divided into two pairs of opposed protuberances (14, 14' and 16, 16'), with each pair having surfaces in registration with each other that are at different axial distances from pad portion (3) and engageable with the side of leaf spring opening opposite to the side into which shank portion (4) is inserted and are able to secure insert (50) to a leaf spring plate having a range of thicknesses upon expanding away from each other upon passing through the leaf spring tip opening.

11 Claims, 3 Drawing Sheets

LEAF SPRING TIP INSERT

This invention relates generally to the securing of a low friction pad for improving ride characteristics and reducing noise and wear between adjacent leaves of a vehicular leaf spring during operation of a vehicle.

BACKGROUND OF THE INVENTION

Nonmetallic, generally polymeric, tip inserts or separator pads have been used between adjacent vehicular leaf spring plates for many years as a means of reducing friction, noise and wear and improving ride as the plates slide relative to each other when the spring flexes during operation of the vehicle. An example involving the use of round metal pellets may be found in U.S. Pat. No. 2,621,921, the disclosure of which is incorporated herein by reference.

Another example involving the use of a leaf spring separator pad at the support end of the longest leaf may be found in U.S. Pat. No. 5,219,151, the disclosure of which is incorporated herein by reference.

The present invention provides an insert having a shank portion adapted to secure the insert to the tips of leaf spring plates having a range of thicknesses and a pad portion adapted to provide separation between adjacent leaf spring plates.

The insert of the present invention has the advantage of being securable to spring leaves having a range of thicknesses, as well as the particular advantage of requiring substantially less force to press through the leaf spring plate opening and requiring a greater force to remove the insert from the leaf spring plate to which it is releasably secured when compared to a prior art type insert having a shank portion divided into only two parts as shown in FIGS. 12 and 13.

SUMMARY OF THE INVENTION

Accordingly, it is an object of this invention to provide an insert that is easily securable to vehicular leaf spring plates having a range of thicknesses and provide a space between adjacent leaves.

It is another object of this invention to provide an insert that is easily securable to vehicular leaf spring plates having a range of thicknesses and provide spacing between adjacent leaves to lower frictional contact therebetween in addition to possessing an attractively low force requirement for installing and high force for removing the insert from the leaf spring.

DESCRIPTION OF THE PREFERRED EMBODIMENT

Figure 1:
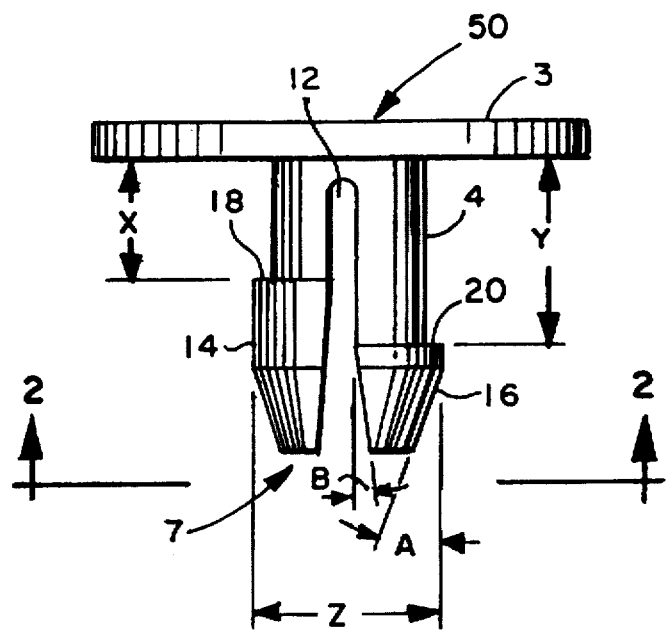
FIG. 1 is a side elevation view of an embodiment of the insert of the invention reference by numeral 50.
Figure 3:
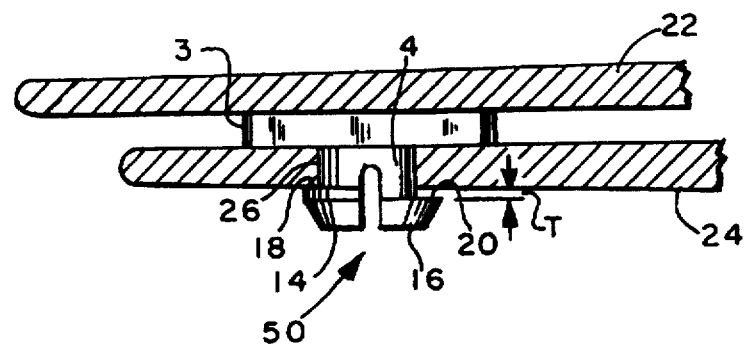
FIG. 3 is a partial cross-section view of insert 50 of FIGS. 1 and 2 providing a pad between leaf spring plates 22 and 24.
Figure 4:
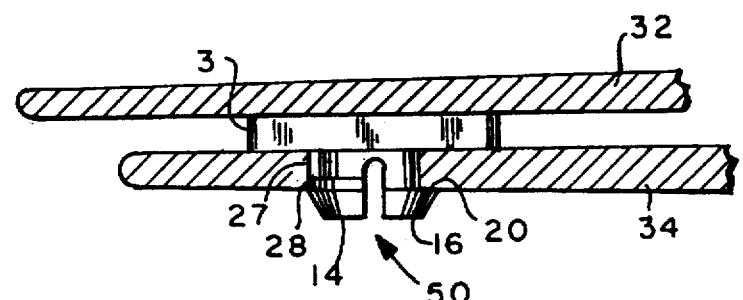
FIG. 4 is a partial cross-section view of insert 50 of FIGS. 1 and 2 providing a pad 3 between leaf spring plates 32 and 34.

In FIG. 1, insert 50 has a pad portion 3 that is adapted to provide a liner between leaf spring plate tip ends, as shown in FIGS. 3 and 4. A shank portion 4 preferably extends substantially perpendicularly from pad portion 3 to a free end 7.

Figure 2:
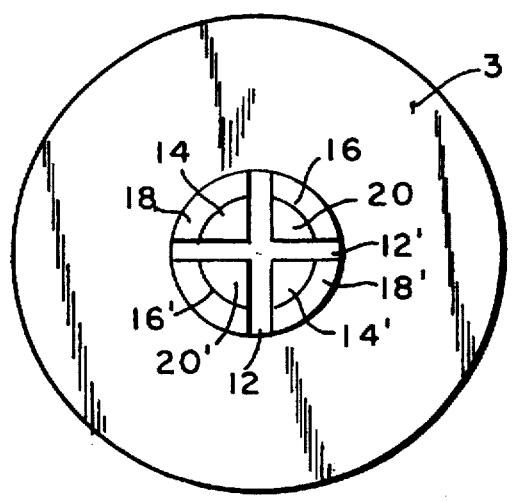
FIG. 2 is a view of insert 50 taken along view line 2—2 in FIG. 1.

Orthogonal slots 12 and 12' (shown in FIG. 2) extend from free end 7 for a prescribed axial distance toward pad portion 3 and divide shaft 4 into four resilient elongated segments having respective corresponding diametrically opposed protuberances 14, 14' and 16, 16' that respectively extend radially outwardly to provide a diametrical width "Z" that, along with the width of slots 12 and 12', is predetermined to enable the segments to compress radially inwardly sufficiently to enable them to be received through the leaf spring tip opening into which shaft 4 is inserted. Diametrically opposed protuberances 14 and 14' have corresponding leaf spring engagement surfaces 18 and 18' that face toward liner portion 3 and are in substantial registration with each other at a prescribed axial distance "X" therefrom. Likewise, diametrically opposed protuberances 16 and 16' have corresponding arcuate leaf spring engagement surfaces 20 and 20' that face toward pad portion 3 and are in substantial registration with each other at an axial distance "Y" from pad portion 3 that is greater than distance "X."

The difference in axial lengths "X" and "Y" enables insert 50 to be securely attached to leaf spring plates having a range of thicknesses, as shown in FIGS. 3 and 4.

Protuberances 14, 14' and 16, 16' are configured to cause them to compress radially inwardly as shaft portion 4 is inserted into the leaf spring tip opening such as by having their respective outer surfaces tapered angularly inwardly in a direction toward free end 7 at an angle "A," of which 20° has been found to be particularly effective in reducing force of inserting/installation.

To enhance compressibility, slots 12 and 12' may be flared outwardly at angle "B" for a prescribed length from free end 7, of which 5°–6° from the center line to provide a preferred included angle of about 10°–12° has been found to be particularly effective.

In FIG. 3, insert 50 is being utilized to provide a space (pad portion 3) between leaf spring plates 22 and 24. The thickness of plate 24 (not referenced) is the same or less than length "X" in FIG. 1 such that when shaft portion 4 is inserted through opening 26 of leaf spring plate 24 until the underside of liner portion 3 abuts against plate 24, protuberances 14, 14' and 16, 16' spring or expand outwardly to enable surfaces 18 and 18' to be engageable with the underside of spring plate 24 to lockingly secure insert 50 to spring plate 24, while plate engagement surfaces 20 and 20' of protuberances 16 and 16' respectively remain at a prescribed distance "T" away from the underside of spring plate 24.

In FIG. 4, leaf spring plate 34 has a thickness (not referenced) that is greater than length "X" and the same or less than length "Y" in FIG. 1 such that arcuate surfaces 20 and 20' of protuberances 16 and 16' respectively are engageable with the underside of leaf spring plate 34, while protuberances 14 and 14' remain compressed within opening 29, as referenced by numeral 28.

FIGS. 5–10 illustrate that the pad portion and shank portion of the insert of the invention are not limited to any particular configuration. Thus, for example, in FIGS. 5 and 6, pad portion 36 of insert 100 is in the form of a flat plate, while shank portion 38 has a substantially circular cross-sectional configuration to eliminate orientation requirements, while the axial distance between the shank portion free end and the pad portion of one pair of diametrically opposed protuberances is less by the axial length "U" than the other.

Figure 7:
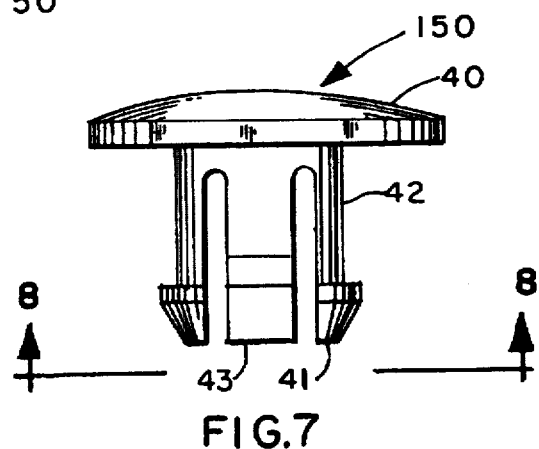
FIG. 7 is a side elevation view of another embodiment of the insert of the invention referenced by numeral 150.
Figure 6:
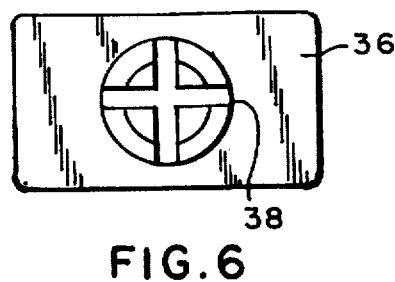
FIG. 6 is a view of insert 100 taken along view line 6—6 in FIG. 5.
Figure 8:
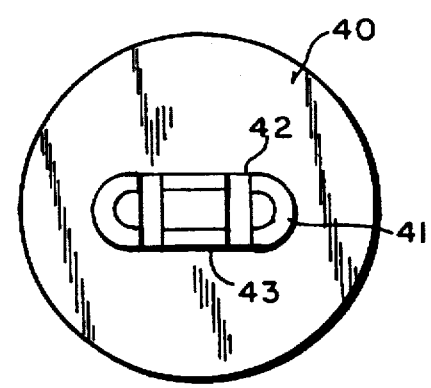
FIG. 8 is a view of insert 150 taken along view line 8—8 in FIG. 7.
Figure 9:
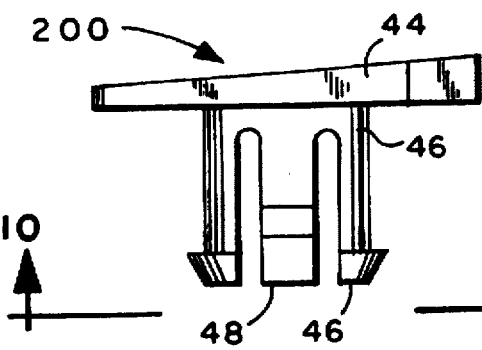
FIG. 9 is a side elevation view of another embodiment of the insert of the invention referenced by numeral 200.
Figure 10:
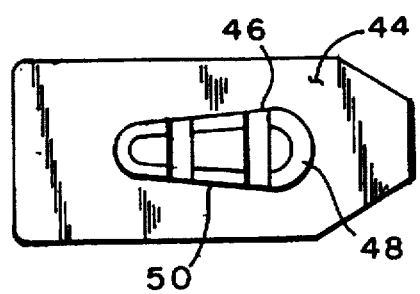
FIG. 10 is a view of insert 200 taken along view line 10—10 in FIG. 9.

In FIGS. 7 and 8, pad portion 40 of insert 150 has a domed configuration to reduce contact area to prevent retention of road debris and shank portion 42 has a generally oval cross-section to improve shank shear strength and prevent rotation with the free-end of one segment referenced by numeral 41 and another by numeral 43. Although shown in FIG. 7 as symmetrical, the dome-shape may have a asymmetrical configuration with its thickest section off-set from center if such is desired. In FIGS. 9 and 10, pad portion 44 of insert 200 has a generally wedge-shaped cross-section to assure adjacent leaf contact at the furthest portion of the plate tip, whereas shank portion 46 has a generally trapezoidal cross-sectional configuration to assure orientation of the high point wedge of the pad to the furthest point on the tip with one segment free-end referenced by numeral 48 and another by numeral 50.

Figure 12:
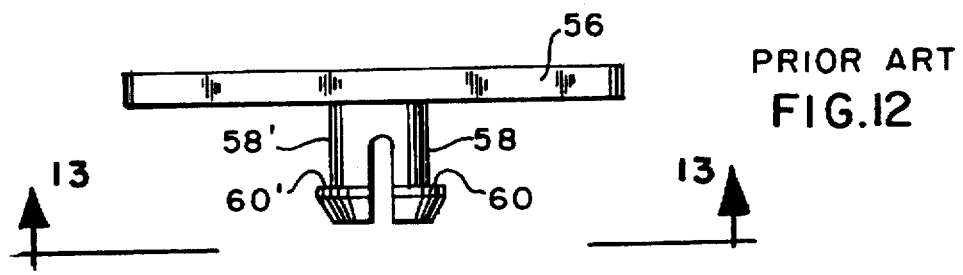
FIG. 12 is a side elevation view of a prior art type tip liner insert.
Figure 13:
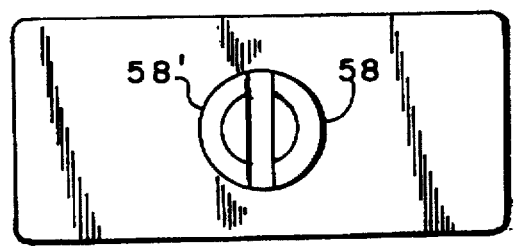
FIG. 13 is a view of the prior art type tip liner insert taken along view line 13—13 in FIG. 12.

The division of the shank portion of the liner insert of the invention into two pairs of diametrically opposed protuberances (four segments) has provided the surprising advantage of creating more flexible legs so that are more easily compressed radially upwardly through the leaf spring plate tip opening without permanent deformation or extrusion enabling them to then expand radially to provide improved retention of the insert to the leaf spring plate. This is in sharp contrast to the shank portion of the prior art type tip liner insert shown in FIGS. 12 and 13 in which the shank portion extending from pad portion 56 is divided into only the two segments 58 and 58' and the pair of opposed engagement surfaces 60 and 60' are not offset from another pair of opposed engagement surfaces as in the case of the tip liner insert of the present invention.

Figure 11:
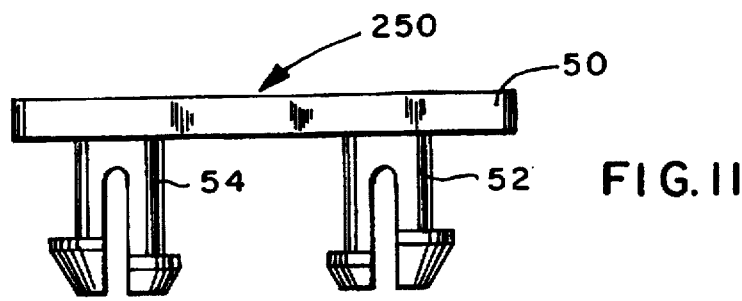
FIG. 11 is a side elevation view of an embodiment of the invention referenced by numeral 250 having a pair of spaced apart shank portions 48 and 50.

Insert 250 of FIG. 11 illustrates that the insert of the invention may have more than one shank portion such as spaced-apart shank portions 52 and 54 that respectively extend preferably substantially perpendicularly from one side of the pad portion 250. The use of such spaced-apart shank portions is effective in preventing twisting of the pad portion 250 during operation of the vehicle.

Figure 5:
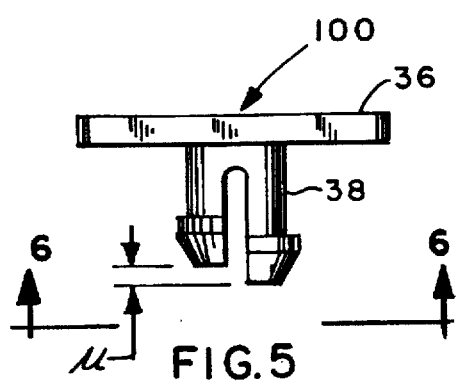
FIG. 5 is a side elevation view of another embodiment of the insert of the invention referenced by numeral 100.

Inserts 150, 200 and 250 also illustrate that, unlike inserts 50 and 100 of FIGS. 1 and 5, the two slots dividing the shank portion into four segments need not be orthogonal to each other and may be at any angular orientation to each other including parallel as shown in FIGS. 8 and 10.

It is believed that the pad portion of the tip liner insert has heretofore been limited to a plate-like configuration having a substantially uniform thickness throughout such as shown in FIGS. 1, 5, and 11. It is believed therefor that the dome-shaped pad portion 40 shown in FIG. 7 and the wedge-shaped pad portion 44 shown in FIG. 9 are in themselves novel configurations having utility and thus patentable in combination with any type of shank portion including those covered by the present invention.

Although the insert of the invention may be made from any material suitable to perform satisfactorily as a spaced pad between vehicular leaf spring plate tips, high-density polyethylene and nylon-teflon compounds have been found to be of particular advantage to reduce friction, avoid noise and yet have high wear resistance at relatively low cost.

What is claimed is:

1. A vehicular leaf spring tip insert, said insert comprising a pad portion having at least one shank portion extending therefrom to a free end and adapted, upon insertion into an opening through the leaf spring tip, to secure the pad portion thereto as a liner between an adjacent leaf spring tip, said shank portion having a pair of slots extending axially from the free end for a prescribed distance there along to provide a first and a second pair of opposed resilient legs disposed in substantial orthogonal relationship to each other, said first leg pair having respective protuberances extending outwardly therefrom having respective leaf spring engagement surfaces in substantial registration with each other facing toward the pad portion at a first axial distance therefrom, said second leg pair having respective protuberances extending outwardly therefrom having respective leaf spring engagement surfaces in substantial registration with each other facing toward the pad portion at a second axial distance therefrom that is greater than the first axial distance, said first and second leg pair protuberances dimensionally adapted and configured so that they are compressed radially inwardly sufficiently to be received through the tip opening upon insertion of the shank portion therethrough with said first leg pair protuberances operative to expand sufficiently to enable the respective leaf spring engagement surfaces thereon to be engageable with and lockingly secure the insert to a leaf spring having a thickness the same as or less than said first axial distance and with said second leg pair protuberances operative to expand sufficiently to enable the respective plate engagement surfaces thereon to become engageable with and lockingly secure the insert to a leaf spring having a thickness that is greater than the axial distance and the same as or less than the second axial distance, while said first leg pair protuberances remain compressed together within said leaf spring opening.

2. The insert of claim 1 having two of the shank portions displaced in spaced-apart relationship to each other.

3. The insert of claim 1 wherein the shank portion has a substantially cylindrical configuration.

4. The insert of claim 1 wherein the shank portion has a substantially oval-shaped cross-section.

5. The insert of claim 1 wherein the shank portion has a substantially trapezoidal-shaped cross-section.

6. The insert of claims 3, 4 or 5 wherein the pad portion is in the form of a flat plate.

7. The insert of claims 3, 4 or 5 wherein the pad portion is in the form of a flat circular plate.

8. The insert of claims 3, 4 or 5 wherein the pad portion is in the form of a flat rectangular plate.

9. The insert of claims 3, 4 or 5 wherein the pad portion has a substantially symmetrical dome-shaped cross-section.

10. The insert of claims 3, 4 or 5 wherein the pad portion has a an asymmetrical dome-shaped cross-section.

11. The insert of claims 3, 4 or 5 wherein the pad portion has a wedge-shaped cross-section.

* * * * *